United States Patent
Tanaka et al.

(10) Patent No.: US 10,146,218 B2
(45) Date of Patent: Dec. 4, 2018

(54) CONTROLLING SYSTEM, ASSISTANCE DEVICE, CONTROLLING DEVICE, AND CONTROL METHOD FOR ADDING TIME CONFIRMATION BETWEEN SEQUENCES OF DATA POINTS COLLECTED FROM MULTIPLE CONTROLLING DEVICES

(71) Applicant: Azbil Corporation, Tokyo (JP)

(72) Inventors: Masato Tanaka, Tokyo (JP); Takashi Kurosawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 159 days.

(21) Appl. No.: 15/223,385

(22) Filed: Jul. 29, 2016

(65) Prior Publication Data

US 2017/0031342 A1    Feb. 2, 2017

(30) Foreign Application Priority Data

Jul. 31, 2015   (JP) .................................. 2015-151670

(51) Int. Cl.
| | |
|---|---|
| G05B 11/01 | (2006.01) |
| G05B 23/02 | (2006.01) |
| G05B 19/042 | (2006.01) |
| G05B 21/02 | (2006.01) |

(52) U.S. Cl.
CPC ....... G05B 23/0262 (2013.01); G05B 19/042 (2013.01); *G05B 21/02* (2013.01); *G05B 2219/34477* (2013.01); *G05B 2219/45031* (2013.01)

(58) Field of Classification Search
CPC .................................................... G05B 19/058
USPC ............................................................. 700/21
See application file for complete search history.

(56) References Cited

U.S. PATENT DOCUMENTS

| | | | |
|---|---|---|---|
| 2009/0228318 A1* | 9/2009 | Ara ........................ | G06Q 10/06 705/7.42 |
| 2014/0249777 A1* | 9/2014 | Tanaka ............... | G05B 23/0232 702/183 |
| 2015/0019040 A1* | 1/2015 | Tanaka ............... | G05D 23/1919 700/299 |
| 2015/0019596 A1* | 1/2015 | Tanaka ............... | G05D 23/1917 707/812 |

(Continued)

FOREIGN PATENT DOCUMENTS

| | | |
|---|---|---|
| CN | 201156208 Y | 11/2008 |
| JP | 2010-219460 A | 9/2010 |

OTHER PUBLICATIONS

Japanese Application No. JP2015-151670, filed Jul. 31, 2015.

*Primary Examiner* — Suresh Suryawanshi
(74) *Attorney, Agent, or Firm* — Amster, Rothstein & Ebenstein LLP (57) ABSTRACT

A time synchronization signal for time series data collected from multiple controlling devices of a PID process is provided. An assistance device concurrently transmits a time confirmation signal to respective controlling devices in a predetermined time confirmation cycle, and the controlling devices forcibly output time confirmation data for synchronizing control data related to the respective controlling devices with each other as a manipulation variable in one control cycle immediately after receiving the time confirmation signal. The time confirmation data is an irregular value that is not outputted as a value of the manipulation variable in a control cycle during a steady control state.

7 Claims, 5 Drawing Sheets

(56) References Cited

U.S. PATENT DOCUMENTS

| | | | |
|---|---|---|---|
| 2015/0046742 A1* | 2/2015 | Hata | G06F 11/3604 |
| | | | 713/502 |
| 2015/0088461 A1* | 3/2015 | Tanaka | G05B 23/027 |
| | | | 702/183 |
| 2016/0004226 A1* | 1/2016 | Tanaka | G05B 11/42 |
| | | | 700/80 |
| 2016/0321330 A1* | 11/2016 | Ziegler | G06F 3/04842 |

* cited by examiner

CONTROLLING SYSTEM, ASSISTANCE DEVICE, CONTROLLING DEVICE, AND CONTROL METHOD FOR ADDING TIME CONFIRMATION BETWEEN SEQUENCES OF DATA POINTS COLLECTED FROM MULTIPLE CONTROLLING DEVICES

CROSS-REFERENCE TO RELATED APPLICATION

The present application claims the benefit of and priority to Japanese Patent Application No. 2015-151670, filed on Jul. 31, 2015, the entire contents of which are incorporated by reference herein.

TECHNICAL FIELD

The present invention relates to an auxiliary technology for aiding time confirmation between sequences of data points collected from multiple controlling devices.

BACKGROUND ART

In recent years, Equipment Engineering Systems (EES) have become popular to use in the manufacture of semiconductor apparatuses. The main purposes of the EES include fault detection (FD) and fault prediction (FP) (see NPL 1). Fault detection and fault prediction systems are organized hierarchically and may include fault detection and fault prediction at various levels such as a device control level, a module level, a sub-system, and an I/O device level. At the I/O device level, sensors or actuators are monitored for failure.

Typically, input data to actuators is transmitted as a long series of bits that represent sequences of control operations.

On the other hand, output data of sensors is a process measurement such as a temperature, a pressure, or a flow rate. It is not reasonable to store all of the output data, especially if sensor readings are taken every few milliseconds.

In light of this technical background, an EES compliant substrate processing device having an arithmetic operation module for obtaining a representative value and a verification module for checking has been proposed (see PTL 1). The representative value includes a maximum value, a minimum value, or an average value, and if fault detection and fault prediction can be realized by one of those values, the amount of data transmitted and the required amount of storage memory can be substantially reduced, and therefore those representative values are effective.

CITATION LIST

Patent Literature

[PTL 1] JP-A-2010-219460

Non-Patent Literature

[NPL 1] "Manual for performance verification of device functions on device level", Semiconductor Production Technology Technical Committee, The Japan Electronics and Information Technology Industries Association, Mar. 23, 2005

SUMMARY OF THE INVENTION

Problem that the Invention is to Solve

The following fault detection and fault prediction techniques using a representative value are known.
Heater Burnout Prediction Due to Deterioration:
 The average value of heater resistance values (non-process measurement) is gradually increased
Heater Burnout Detection Due to Overcurrent:
 The maximum value of the heater resistance values is suddenly increased However, it is unlikely that fault detection and fault prediction are established by simply using the process amount as the representative value. Consequently, the implementation of fault detection and fault prediction with the use of data measured by a large number of sensors has become widespread. There is a relationship (linkage) between time series data collected from each sensor.

Thus, precise time synchronization between multiple time series data may be required depending on the type of data or the purpose of fault detection or fault prediction. However, the time synchronization processing may not be enabled in a system that involves processing a large amount of data depending on the configuration of data collection. In other words, when it is difficult to add a time stamp for time confirmation, at least a time when data has been acquired after the data collection cannot be confirmed. Hence, an improvement in the confirmation of the time synchronization is demanded.

The present invention has been made to solve the above problem, and an object of the present invention is to provide an auxiliary technology that is capable of aiding time synchronization confirmation (time synchronization confirmation compliant restoration) between time series data collected from multiple controlling devices.

Means for Solving the Problem

In order to achieve the above object, according to an embodiment of the present invention, a control system including: a plurality of controlling devices that each output a manipulation variable to a facility; a data collecting device coupled to at least one of the plurality of controlling devices, the data collecting device configured to sequentially collect control data including the manipulation variable as time series data; and an assistance device coupled to each of the plurality of controlling devices, the assistance device configured to concurrently transmit a time confirmation signal to each of the plurality of controlling devices in a predetermined time confirmation cycle, wherein the manipulation variable includes a value calculated based on an input set value and an input control variable in a steady control state and includes a time confirmation data in response to receiving the time confirmation signal.

In one embodiment of the control system according to the present invention, the time confirmation data includes an irregular value that is not outputted in a steady control state of the plurality of controlling devices.

In one embodiment of the control system according to the present invention, the time confirmation signal includes an instruction to change a setting parameter in each of the plurality of controlling devices so that the time confirmation data is outputted as the manipulation variable.

In one embodiment of the control system according to the present invention, the instruction directs a change in a manipulation variable lower limit value or a manipulation variable upper limit value.

In one embodiment of the control system according to the present invention, the time confirmation signal includes a signal for instructing a change in a manipulation variable lower limit value or a manipulation variable upper limit value used for limit processing on the manipulation variable in the controlling devices, and the controlling devices change the manipulation variable lower limit value or the manipulation variable upper limit value according to the time confirmation signal to forcibly output the time confirmation data including the singular value instead of the manipulation variable, when receiving the time confirmation signal.

In one embodiment of the control system according to the present invention, a control system includes: a plurality of controlling devices that each output a manipulation variable to a facility; a data collecting device coupled to at least one of the plurality of controlling devices, the data collecting device configured to sequentially collect control data including the manipulation variable as time series data; and an assistance device coupled to each of the plurality of controlling devices, the assistance device configured to concurrently transmit a time confirmation signal to each of the plurality of controlling devices in a predetermined time confirmation cycle to forcibly output time confirmation data as the manipulation variable.

In one embodiment of the control system according to the present invention, a control system includes: an assistance device including: a control cycle counting portion; and a time confirmation transmitting portion configured to transmit a time confirmation signal; a controlling device coupled to the assistance device including: a set value acquiring portion configured to obtain an input set value; a control variable inputting portion configured to obtain an input control variable; a manipulation variable calculating portion configured to calculate a manipulation variable based on the input set value and the input control variable; a time confirmation receiving portion configured to receive the time confirmation signal; and a limit processing portion configured to adjust the manipulation variable, a manipulation variable lower limit value, and a manipulation variable upper limit value; and a data collective device coupled to the controlling device including: a manipulation variable acquiring portion configured to receive the manipulation variable; and a data storage portion configured to sequentially collect control data including the manipulation variable as time series data.

In one embodiment of the control system according to the present invention, a control method including the steps of: outputting a manipulation variable by each of a plurality of controlling devices in a control cycle; sequentially collecting control data including the manipulation variable as time series data by a data collecting device; and concurrently transmitting a time confirmation signal to each of the plurality of controlling devices in a predetermined time confirmation cycle by an assistance device, wherein the manipulation variable includes a value calculated based on an input set value and an input control variable in a control cycle during a steady control state and includes a time confirmation data in a control cycle in which the time confirmation signal is received.

In one embodiment of the control system according to the present invention, a control method includes changing a setting parameter in each of the plurality of controlling devices so that the time confirmation data is outputted as the manipulation variable.

In one embodiment of the control system according to the present invention, a control method includes: changing a manipulation variable lower limit value or a manipulation variable upper limit value Advantage of the Invention According to the present invention, the time confirmation data is recorded as the manipulation variable in the time confirmation cycle, on the time series data collected from the respective controlling devices in parallel. Therefore, the time synchronization of the respective time series data can be confirmed easily and precisely with reference to a fact that the time confirmation data indicates the same time.

MODE FOR CARRYING OUT THE INVENTION

[Principle 1 of the Invention]

First, a principle 1 of the present invention will be described. For a controlled objective of a process system such as a temperature or a pressure setting, a range or timing in which corresponding measured data is varied during one control cycle is limited. In particular, attention is paid to the fact that the occurrence of a phenomenon that the corresponding measured data is instantaneously varied and immediately returned to an original value is substantially zero.

It is conceived that an impossible rapid variation can be added only for a moment (for example, a short period of time of one control cycle) before collecting the data, and the rapid variation can be used as pseudo time confirmation data (intentional abnormal number) after collecting the data. In other words, when the time confirmation data is inserted into multiple time series data in synchronization, the time synchronization can be confirmed. Since such a spike noise variation can be removed easily by a median filter after collecting the data, accuracy of the collected data is maintained.

[Principle 2 of the Invention]

Subsequently, a principle 2 of the present invention will be described.

Representative time series data involved in a PID (proportional integral derivative) controlling system includes a set value SP, a control variable PV, and a manipulation variable MV. Since the set value SP and the control variable PV are inputs to the PID calculation, if the pseudo time confirmation data (intentional abnormal number) is to be inserted into those time series data, the PID calculation would be distorted depending on a signal path. In other words, a consideration for separating the signal path from a data storage path is required as an additional process of a PID control user.

From the above viewpoint, since the manipulation variable MV is an output of the PID calculation, an abnormal value associated with an impulsive change that is outside the range of the dynamic characteristics of the controlled object does not affect the control. Furthermore, as a method of not affecting an internal variable of the PID calculation in any form of the PID calculation, attention is paid to the fact that it is preferable to use upper and lower limit processing of the manipulation variable MV downstream of the PID calculation per se. A process for forcibly changing the upper and lower limits of a manipulation variable of one or more lower-level devices (e.g., controlling device) from a higher-level device (e.g., assistance device) at the same time only for a short period of time is conceived for multiple control loops.

Next, an embodiment of the present invention will be described with reference to the drawings.

[Controlling System]

Figure 1:
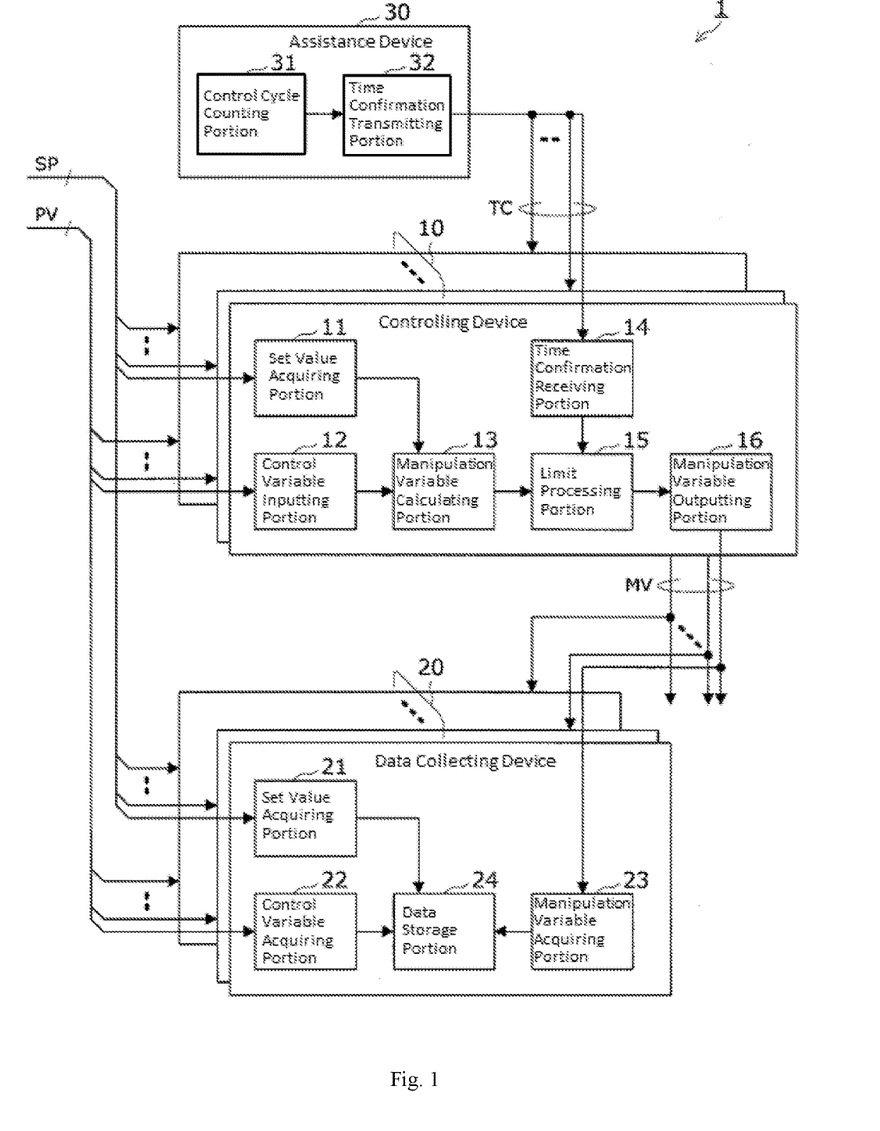
FIG. 1 is a block diagram illustrating a configuration of a controlling system according to an embodiment of the present invention.
Figure 2:
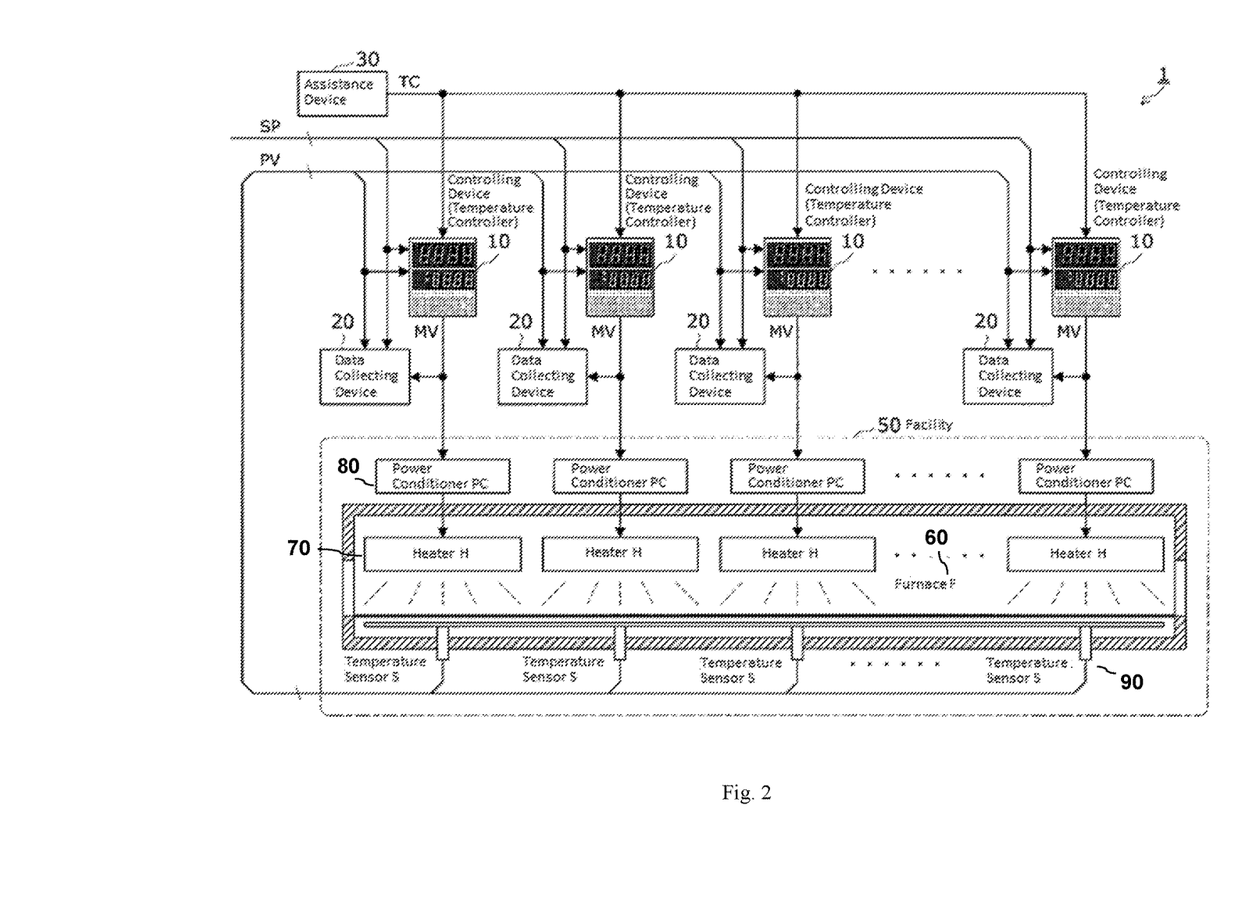
FIG. 2 is an illustrative view illustrating an applied example of the controlling system according to an embodiment of the present invention.

First, a controlling system 1 according to the present embodiment will be described with reference to FIGS. 1 and 2. The controlling system 1 is an embodiment corresponding to the principles 1 and 2 of the invention described above. FIG. 1 is a block diagram illustrating a configuration of the controlling system according to the present embodiment. FIG. 2 is an illustrative view illustrating an applied example of the controlling system according to the present embodiment.

A controlling system 1 illustrated in FIG. 1 is a system for controlling various facilities 50 based on a process control such as a PID, and includes multiple controlling devices 10, multiple data collecting devices 20 provided in the respective controlling devices 10, and an assistance device 30 that operates with the controlling devices 10 and the data collecting devices 20.

In order to facilitate understanding of the invention, an example in which a data collecting device 20 is provided for each of the controlling devices 10 will be described. Alternatively, a single data collecting device 20 may collect control data from the multiple controlling devices 10, or the function of the data collecting device 20 may be installed in a high-level device (not shown) such as a server.

Further, the assistance device 30 may be mounted in any one of the controlling devices 10, and transmit a time confirmation signal to the other controlling devices 10. The assistance device 30 may be mounted in a data collecting device 20, or in a high-level device, and transmit the time confirmation signal to the respective controlling devices 10.

FIG. 2 illustrates an example in which the facility 50 applied to the controlling system 1 is a heating device used in a semiconductor manufacturing apparatus, and a temperature controller for adjusting an internal temperature of a furnace F 60 is used as the controlling device 10. Multiple heaters H 70 are disposed inside of the furnace F 60. Each heater H 70 includes a controlling device (temperature controller) 10, a power conditioner PC 80, a temperature sensor S 90, and the data collecting device 20.

The controlling device (temperature controller) 10 calculates a manipulation variable MV according to the set value SP that is operationally inputted and registered in an internal storing portion (not shown) in advance and the control variable PV that is an internal temperature of the furnace F 60 which is detected by the temperature sensor S 90 in a predetermined control cycle. The power conditioner PC 80 adjusts a power to be supplied to the corresponding heater H 70 based on the manipulation variable MV from the controlling device 10, to thereby control a furnace temperature measured near the corresponding heater H 70.

The data collecting device 20 sequentially collects control data (control parameters) such as the set value SP, the control variable PV, and the manipulation variable MV related to the control by the corresponding controlling device 10 as time series data.

According to the present invention, in the controlling system 1 as described above, the time confirmation data for synchronizing the control data related to the respective controlling devices 10 with each other is forcibly output from the respective controlling devices 10 as the manipulation variable MV in one control cycle, on the basis of the time confirmation signal to be transmitted from the assistance device 30 in the predetermined time confirmation cycle. In the above configuration, in each of the data collecting devices 20, the time confirmation data is recorded as a manipulation variable MV in the time confirmation cycle, as part of the time series data collected from the respective controlling devices 10 in parallel. Therefore, the time synchronization of the respective time series data can be confirmed easily and precisely with reference to a fact that the time confirmation data indicates the same time.

Then, a configuration of the controlling system 1 according to the present embodiment will be described with reference to FIGS. 1 and 2.

[Controlling Device]

First, a configuration of the controlling devices 10 will be described. Each of the controlling devices 10 includes, as main function portions, a set value acquiring portion 11, a control variable inputting portion 12, a manipulation variable calculating portion 13, a time confirmation receiving portion 14, a limit processing portion 15, and a manipulation variable outputting portion 16.

The set value acquiring portion 11 has a function of acquiring the set value SP that is operationally inputted and registered in an internal storing portion (not shown) in advance. In this situation, when the set value SP is set by not the operational input but a high-level device, the set value acquiring portion 11 acquires the set value SP instructed from the high-level device, and registers the set value SP in the internal storing portion.

The control variable inputting portion 12 has a function of inputting the control variable PV corresponding to the controlling device 10 which is detected in the facility 50.

The manipulation variable calculating portion 13 has a function of sequentially calculating a new manipulation variable MV from the set value SP acquired in the set value acquiring portion 11 and the control variable PV input by the control variable inputting portion 12 in a predetermined control cycle, based on a control algorithm such as a PID control.

The time confirmation receiving portion 14 has a function of waiting for the time confirmation signal to be transmitted from the assistance device 30, and outputting the received time confirmation signal to the limit processing portion 15.

The limit processing portion 15 has a function of performing limit processing for correcting the manipulation variable MV calculated by the manipulation variable calculating portion 13 within a limited range defined by a manipulation variable lower limit value OL and a manipulation variable upper limit value OH which are set in advance when receiving no time confirmation signal by the time confirmation receiving portion 14. The limit processing portion 15 also has a function of temporarily employing a time confirmation limit value instructed by the time confirmation signal as the manipulation variable lower limit value OL or the manipulation variable upper limit value OH in one control cycle immediately after receiving the time confirmation signal when receiving the time confirmation signal by the time confirmation receiving portion 14.

The manipulation variable outputting portion 16 has a function of outputting the manipulation variable MV subjected to the limit processing by the limit processing portion 15 to the power conditioner PC 80 corresponding to the respective controlling device 10 in the facility 50.

[Data Collecting Device]

Then, a configuration of the data collecting devices 20 will be described. Each of the data collecting devices 20 includes, as main function portions, a set value acquiring portion 21, a control variable acquiring portion 22, a manipulation variable acquiring portion 23, and a data storage portion 24.

The set value acquiring portion 21 has a function of acquiring the set value SP from the controlling device 10 corresponding to the respective data collecting device 20.

The control variable acquiring portion 22 has a function of acquiring the control variable PV inputted from the facility 50 to the controlling device 10 corresponding to the respective data collecting device 20.

The manipulation variable acquiring portion 23 has a function of acquiring the manipulation variable MV outputted to the facility 50 from the controlling device 10 corresponding to the respective data collecting device 20.

The data storage portion 24 has a function of sequentially storing a set of control data including the set value SP, the control variable PV, and the manipulation variable MV, which are acquired by the set value acquiring portion 21, the control variable acquiring portion 22, and the manipulation variable acquiring portion 23, respectively, in the same control cycle as the time series data for each control cycle.

[Assistance Device]

Then, a configuration of the assistance device 30 will be described. The assistance device 30 is provided with a control cycle counting portion 31 and a time confirmation transmitting portion 32 as main function portions.

The control cycle counting portion 31 has a function of counting a control cycle used in the controlling device 10.

The time confirmation transmitting portion 32 has a function of concurrently transmitting the time confirmation signal to the respective controlling devices 10 at a time when an arrival of the time confirmation cycle has been confirmed by the counting result in the control cycle counting portion 31.

In the present embodiment, the time confirmation cycle corresponds to a specified number N times (N is an integer of 2 or more) of the control cycle. The control cycle is generated based on a specified clock signal in the control cycle counting portion 31. It is confirmed that the time confirmation cycle has arrived when the counting result of the control cycle reaches N times.

The time confirmation signal is a signal that instructs the controlling device 10 to change the value of the manipulation variable MV to an irregular value that is not outputted as the manipulation variable MV in the steady control state. For example, a signal for instructing a setting change in the manipulation variable lower limit value OL or the manipulation variable upper limit value OH used in the limit processing of the manipulation variable MV in the controlling device 10 is used.

[Operation of Controlling System]

Then, the operation of the controlling system 1 according to the present embodiment will be described.

[Controlling Device]

First, the operation of the controlling device 10 will be described. The controlling device 10 executes the following processing for each predetermined control cycle.

First, the set value acquiring portion 11 acquires the set value SP from the internal storing portion registered by the operation input in advance. The control variable inputting portion 12 receives the control variable PV corresponding to the respective controlling device 10 which is detected by the facility 50.

Thereafter, the manipulation variable calculating portion 13 calculates a new manipulation variable MV based on the set value SP acquired in the set value acquiring portion 11 and the control variable PV inputted by the control variable inputting portion 12.

Then, the limit processing portion 15 performs the limit processing for correcting the new manipulation variable MV calculated by the manipulation variable calculating portion 13 within a range defined by the manipulation variable lower limit value OL and the manipulation variable upper limit value OH which have been set as the control limit value used for a normal control in advance.

Thereafter, the manipulation variable outputting portion 16 outputs the manipulation variable MV subjected to the limit processing by the limit processing portion 15 to the facility 50, and completes a series of processing.

On the other hand, the time confirmation receiving portion 14 waits for the time confirmation signal to be transmitted from the assistance device 30, and outputs the time confirmation signal to the limit processing portion 15 according to the reception of the time confirmation signal.

When the time confirmation signal has been received by the time confirmation receiving portion 14, the limit processing portion 15 temporarily employs a time confirmation limit value instructed by the time confirmation signal as the manipulation variable lower limit value OL or the manipulation variable upper limit value OH in one control cycle immediately after receiving the time confirmation signal. When the time confirmation signal has not been received, the limit processing portion 15 employs an original control limit value.

In the limit processing, when the input manipulation variable MV falls below the manipulation variable lower limit value OL, the manipulation variable lower limit value OL is output as the manipulation variable MV. When the input manipulation variable MV exceeds the manipulation variable upper limit value OH, the manipulation variable upper limit value OH is output as the manipulation variable MV. Each of the manipulation variable lower limit value OL and the manipulation variable upper limit value OH is normally set as a percentage of the predetermined manipulation variable MV to a range (0-100%). In a general temperature controlling system, the manipulation variable lower limit value OL is set to about 0%, and the manipulation variable upper limit value OH is set to about 100%.

In the steady control state where the PID control is continued, the manipulation variable MV becomes equal to or less than 90% which is sufficiently lower than 100% in most cases. Therefore, when the manipulation variable upper limit value OH is changed to 0% in only one control cycle, the manipulation variable MV is forcibly subjected to the limit processing down to 0% which is an irregular value, and a spike noise variation occurs in the manipulation variable MV.

In addition, in the steady control state where the PID control is continued, the manipulation variable MV becomes equal to or more than 10% which is sufficiently higher than 0% in most cases. Therefore, when the manipulation variable lower limit value OL is set to 100% in only one control cycle, the manipulation variable MV is forcibly subjected to the limit processing up to 100% which is an irregular value, and the spike noise variation occurs in the manipulation variable MV.

As a result, an irregular value that is not outputted as the manipulation variable MV in the steady control state in the controlling device 10 is outputted in response to each time confirmation signal from the assistance device 30, that is, for each time confirmation cycle. Accordingly, in each of the data collecting devices 20, the time confirmation data is recorded as the manipulation variable MV in the time confirmation cycle, on the time series data collected from the corresponding controlling device 10 in parallel. For that reason, the time synchronization of the respective time series data can be confirmed easily and precisely with reference to a fact that the time confirmation data indicates the same time.

[Data Collecting Device]

Then, the operation of the data collecting device 20 will be described. The data collecting device 20 executes the following processing for each predetermined control cycle.

First, the set value acquiring portion 21 has a function of acquiring the set value SP from the controlling device 10 by performing a data communication with the controlling device 10 corresponding to the subject data collecting device 20.

The control variable acquiring portion 22 has a function of acquiring the control variable PV inputted from the facility 50 to the controlling device 10 corresponding to the respective data collecting device 20. In this situation, the control variable acquiring portion 22 may acquire the control variable PV by branching a signal line from the facility 50 to the controlling device 10, or may acquire the control variable PV by performing the data communication with the controlling device 10.

The manipulation variable acquiring portion 23 has a function of acquiring the manipulation variable MV outputted to the facility 50 from the controlling device 10 corresponding to the respective data collecting device 20. In this situation, the manipulation variable acquiring portion 23 may acquire the manipulation variable MV by branching a signal line to the facility 50 from the controlling device 10, or may acquire the manipulation variable MV by performing the data communication with the controlling device 10.

The data storage portion 24 sequentially stores a set of control data including the set value SP, the control variable PV, and the manipulation variable MV, which are acquired by the set value acquiring portion 21, the control variable acquiring portion 22, and the manipulation variable acquiring portion 23, respectively, in the same control cycle as the time series data for each control cycle.

[Assistance Device]

Next, the operation of the assistance device 30 will be described. The assistance device 30 always executes the following processing.

First, the control cycle counting portion 31 generates the control cycle used by the controlling device 10 on the basis of a specified clock signal generated internally, and counts the control cycle.

The time confirmation transmitting portion 32 concurrently transmits the time confirmation signal to the respective controlling devices 10 at a time when the counting result by the control cycle counting portion 31 reaches the specified number N to confirm the arrival of the time confirmation cycle. In this situation, the control cycle counting portion 31 transmits, for example, an instruction for changing the manipulation variable upper limit value OH to 0%, or an instruction for changing the manipulation variable lower limit value OL to 100%, as the time confirmation signal.

As a result, the manipulation variable upper limit value OH or the manipulation variable lower limit value OL used in the limit processing portion 15 of each controlling device 10 is temporarily changed from the control limit value to the time confirmation limit value for one control cycle corresponding to the receipt of the respective time confirmation signal. An irregular value that is not outputted in the steady control state of the controlling device 10 is outputted as the manipulation variable MV for each time confirmation cycle.

Accordingly, in each of the data collecting devices 20, the time confirmation data is recorded as the manipulation variable MV in the time confirmation cycle, as part of the time series data collected from the corresponding controlling device 10 in parallel. For that reason, the time synchronization of the respective time series data can be confirmed easily and precisely with reference to a fact that the time confirmation data indicates the same time.

Figure 3:
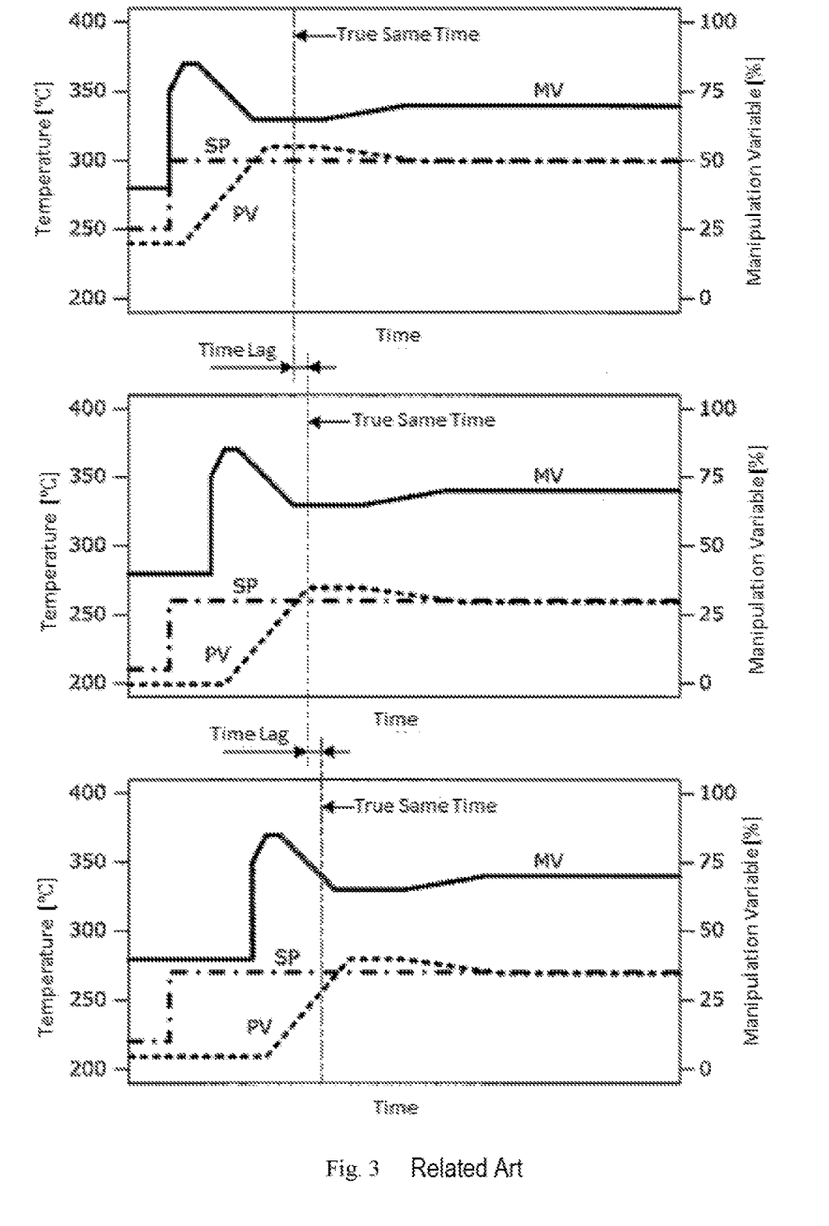
FIG. 3 is a diagram illustrating a conventional data collection example.

FIG. 3 illustrates a conventional data collection example. In this example, the time series data including the set value SP, the control variable PV, and the manipulation variable MV which are collected from three controlling devices is graphed. In the conventional data collection, because there is no reference for synchronizing the three time series data with each other on a time axis, the time confirmation between the time series data is performed, for example, with reference to a collection time. For that reason, when a time lag is present in the collection time, even if the time lag occurs in a true same time of the respective time series data, a data confirmer such as an operator cannot recognize the time lag. Therefore, a precise time synchronization confirmation required for an FD and an FP cannot be performed.

Figure 4:
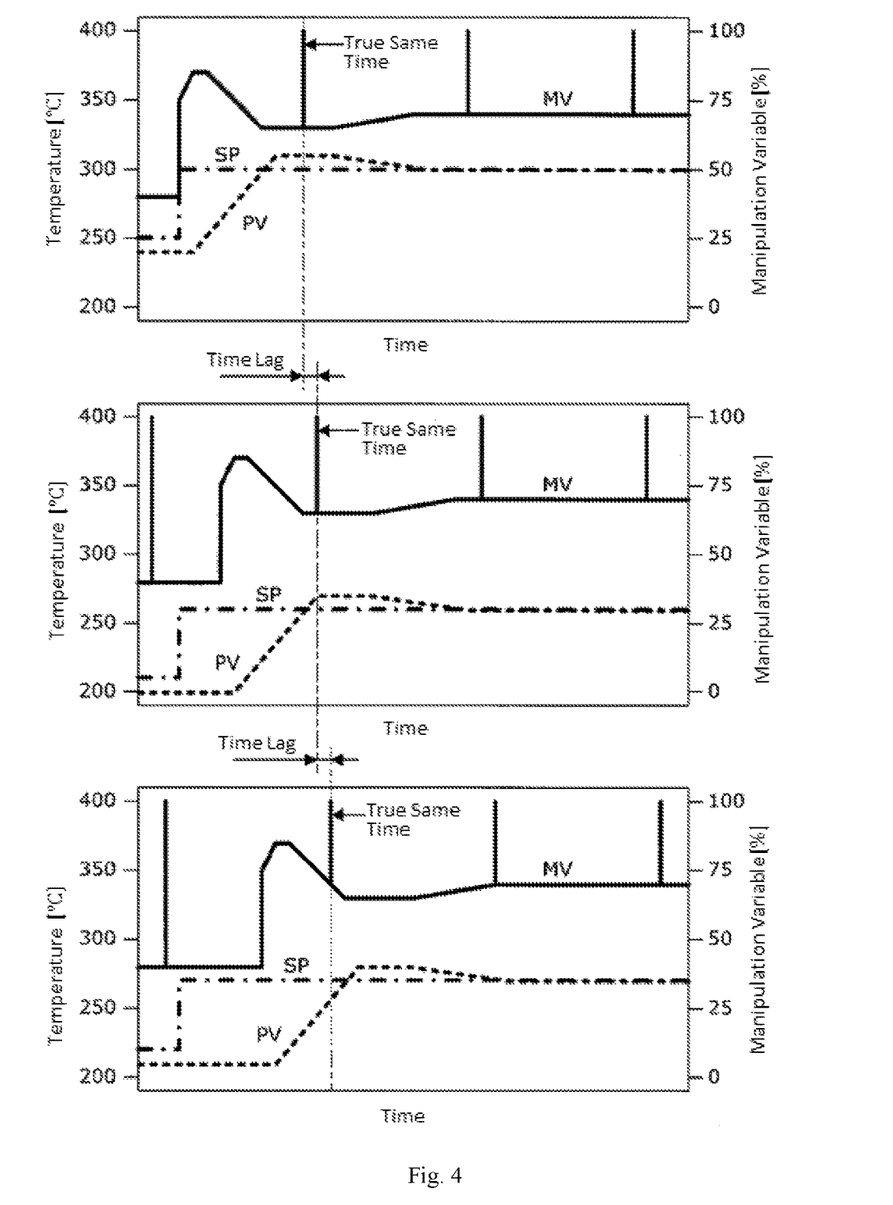
FIG. 4 is a diagram illustrating a data collection example according to an embodiment of the present invention.

FIG. 4 illustrates a data collection example according to the present invention. In this example, a signal for changing the manipulation variable lower limit value OL to 100% is transmitted as the time confirmation signal, and a spike-shaped time confirmation data in which the manipulation variable MV of each time series data becomes 100% is included at each prescribed timing, that is, at each true same time of the time confirmation cycle.

Figure 5:
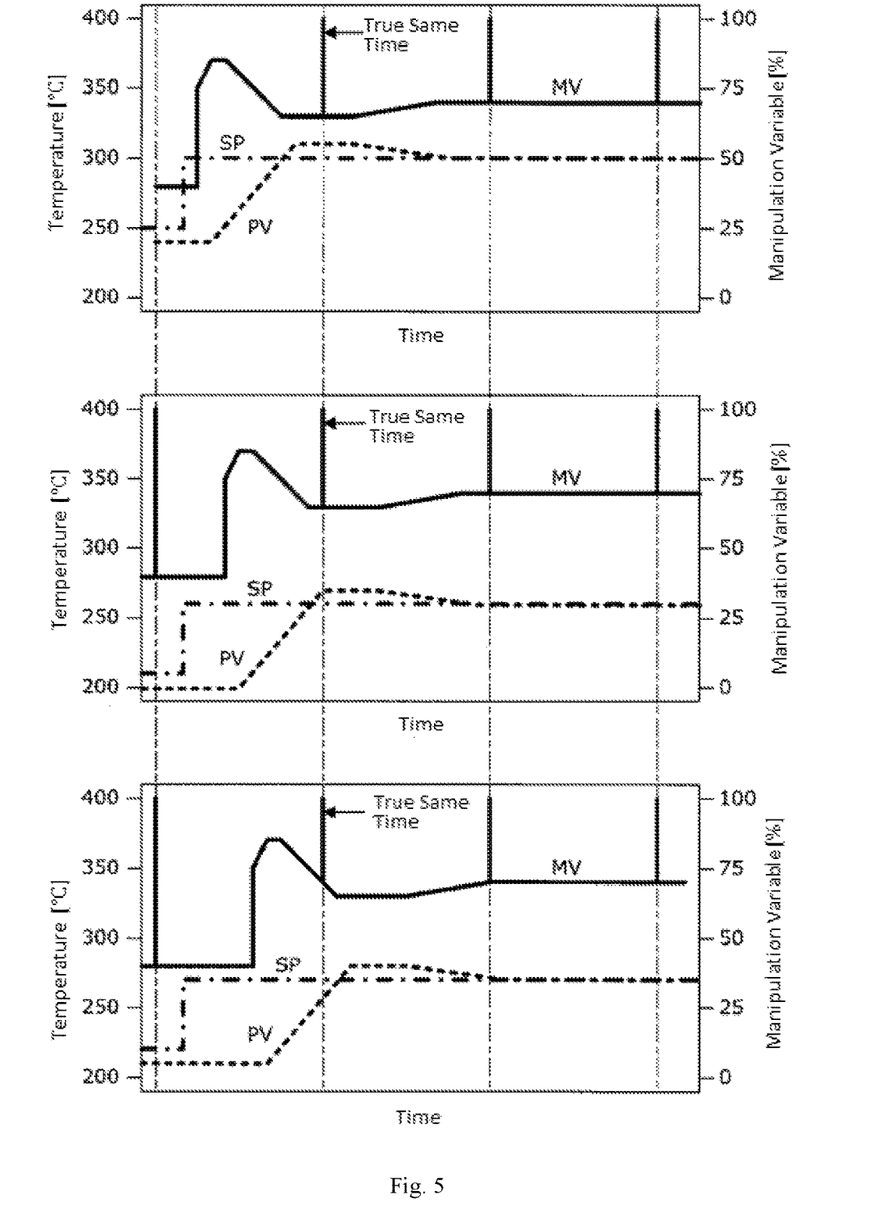
FIG. 5 is a diagram illustrating a time lag correction example in FIG. 4.

Therefore, the time lag of the three time series data can be corrected with reference to those time confirmation data. FIG. 5 illustrates a time lag correction example in FIG. 4. As a result, even if the time lag is present in the collection time, and the time lag occurs in the true same time of the respective time series data, the data confirmer such as the operator can easily recognize the time lag, and a precise time synchronization confirmation required for the FD and the FP can be performed. The time lag correction of the time series data may be manually performed by the data confirmer, or may be automatically implemented. The time confirmation data may be automatically removed by a median filter when performing a screen display or transferring data to an external device.

[Advantages of the Present Embodiment]

As described above, according to the present embodiment, the assistance device 30 concurrently transmits the time confirmation signal to the respective controlling devices 10 in the predetermined time confirmation cycle, and the controlling devices 10 forcibly output the time confirmation data for synchronizing the control data related to the respective controlling devices 10 with each other as the manipulation variable in one control cycle immediately after receiving the time confirmation signal.

With the above configuration, in each of the data collecting devices 20, the time confirmation data is recorded as the manipulation variable MV in the time confirmation cycle as part of the time series data collected from the corresponding controlling device 10 in parallel. Therefore, the time synchronization of the respective time series data can be confirmed easily and precisely with reference to a fact that the time confirmation data indicates the same time.

In addition, according to the present embodiment, because the time confirmation data varies the manipulation variable MV in a spike fashion, the data confirmer can easily recognize the time confirmation data on the time series data, and can easily remove the time confirmation data by the median filter when using the time series data, and therefore the treatment is facilitated.

When the time confirmation data is inserted into the set value SP or the control variable PV which are data that are inputs to the PID calculation, the PID calculation is distorted depending on a signal path. Therefore, a consideration for separating the signal path from a data storage path is required as a process of a PID control user. According to the present embodiment, since the time confirmation data is inserted into the manipulation variable MV downstream of the PID calculation, an impact on the PID calculation can be easily avoided. Although the time confirmation data inserted into the manipulation variable MV is outputted to the controlled object, the irregular value inserted as time confirmation data corresponds to an impulse change that cannot be normally followed in one control cycle of the controlling device according to a dynamic range characteristic of the controlled object. Thus, an impact on the control can be sufficiently ignored.

In the present embodiment, an irregular value, i.e., a value that is not normally outputted as the manipulation variable MV in the steady control state of the controlling device 10, may be used as the time confirmation data. As a result, the time confirmation data can be easily recognized from the manipulation variable MV of the collected time series data.

Further, in the present embodiment, the assistance device 30 may transmit a signal for instructing a change in the setting parameter in the controlling device 10 so that the manipulation variable MV becomes the irregular value, as the time confirmation signal. In more detail, the time confirmation signal is set as a signal for instructing a change in the manipulation variable lower limit value OL or the manipulation variable upper limit value OH used in the limit processing for the manipulation variable MV in the controlling device 10. When receiving the time confirmation signal, the controlling device 10 may change the manipulation variable lower limit value OL or the manipulation variable upper limit value OH according to the subject time confirmation signal to forcibly output the time confirmation data including the irregular value instead of the manipulation variable MV.

As a result, the time confirmation data can be outputted in the time confirmation cycle with the use of the setting change function installed in the controlling device 10 in advance, specifically, with the use of the setting change function for changing the limiter value used in the limiter processing. The present invention can be applied without remarkably changing the configuration of the controlling device 10, and introduction costs of the present invention can be suppressed.

[Extension of the Embodiments]

Although the invention has been described above with reference to the embodiments, the invention is not limited to the above embodiments. Various changes found by those skilled in the art can be made to the structure and details of the invention within the scope of the invention. In addition, embodiments can be practiced in any combination without occurrence of a contradiction.

DESCRIPTION OF REFERENCE NUMERALS AND SIGNS

1 . . . controlling system, 10 . . . controlling device, 11 . . . set value acquiring portion, 12 . . . control variable inputting portion, 13 . . . manipulation variable calculating portion, 14 . . . time confirmation receiving portion, 15 . . . limit processing portion, 16 . . . manipulation variable outputting portion, 20 . . . data collecting device, 21 . . . set value acquiring portion, 22 . . . control variable acquiring portion, 23 . . . manipulation variable acquiring portion, 24 . . . data storage portion, 30 . . . assistance device, 31 . . . control cycle counting portion, 32 . . . time confirmation transmitting portion, 50 . . . facility, SP . . . set value, PV . . . control variable, MV . . . manipulation variable, OL . . . manipulation variable lower limit value, OH . . . manipulation variable upper limit value, 60 . . . furnace F, 70 . . . heater H, 80 . . . power conditioner PC, 90 . . . sensor S.

The invention claimed is:

1. A control system comprising:
   a plurality of controlling devices that are each coupled to a corresponding apparatus and that each output a manipulation variable for controlling the corresponding apparatus, the manipulation variable comprising a value calculated based on an input set value and an input control variable in a steady control state of the each controlling device;
   at least one data collecting device coupled to the plurality of controlling devices, the at least one data collecting device configured to sequentially collect control data including the manipulation variables of the plurality of controlling devices as time series data; and
   an assistance device coupled to the plurality of controlling devices, the assistance device configured to concurrently transmit a time confirmation signal to each of the plurality of controlling devices in a predetermined time confirmation cycle,
   wherein the each controlling device outputs the manipulation variable further comprising time confirmation data upon receiving the time confirmation signal, and
   wherein the time confirmation data comprises an irregular value that is not outputted in the steady control state of the plurality of controlling devices.

2. A control system according to claim 1, wherein the time confirmation signal comprises an instruction to change a setting parameter in each of the plurality of controlling devices so that the time confirmation data is outputted as the manipulation variable.

3. A control system according to claim 2, wherein the instruction directs a change in a manipulation variable lower limit value or a manipulation variable upper limit value.

4. A control system comprising:
   an assistance device comprising:
      a control cycle counting portion; and
      a time confirmation transmitting portion configured to transmit a time confirmation signal;
   a controlling device coupled to the assistance device, the controlling device comprising:
      a set value acquiring portion configured to obtain an input set value;
      a control variable inputting portion configured to obtain an input control variable;

a manipulation variable calculating portion configured to calculate a manipulation variable based on the input set value and the input control variable;

a time confirmation receiving portion configured to receive the time confirmation signal;

a limit processing portion configured to adjust a manipulation variable lower limit value or a manipulation variable upper limit value upon the time confirmation receiving portion receiving the time confirmation signal; and an output configured to output the calculated manipulation variable to one or more apparatuses coupled to the controlling device, the calculated manipulation variable being adapted to control an operation of the one or more apparatuses; and a data collective device coupled to the controlling device comprising:

a manipulation variable acquiring portion configured to receive the manipulation variable; and a data storage portion configured to sequentially collect control data including the manipulation variable as time series data.

5. A control method comprising the steps of:

outputting by each of a plurality of controlling devices, a manipulation variable in a control cycle for controlling a correspond apparatus coupled to the each controlling device, the manipulation variable comprising a value calculated based on an input set value and an input control variable in a steady control state of the each controlling device;

sequentially collecting control data including the manipulation variable as time series data by a data collecting device;

concurrently transmitting, by an assistance device, a time confirmation signal to each of the plurality of controlling devices in a predetermined time confirmation cycle; and outputting, by the each controlling device upon receiving the time confirmation signal, the manipulation variable further comprising time confirmation data, wherein the time confirmation data comprises an irregular value that is not outputted in the steady control state of the plurality of controlling devices.

6. A control method according to claim 5, further comprising the step of:

changing a setting parameter in each of the plurality of controlling devices so that the time confirmation data is outputted as the manipulation variable.

7. A control method according to claim 6, further comprising the step of:

changing a manipulation variable lower limit value or a manipulation variable upper limit value.

* * * * *